United States Patent [19]

Kunimune et al.

[11] Patent Number: 4,892,189

[45] Date of Patent: Jan. 9, 1990

[54] CASE FOR MULTIPLE COMPACT DISKS

[75] Inventors: Noriaki Kunimune, Higashiosaka; Yukio Wada, Kyoto, both of Japan

[73] Assignee: Kunimune Kogyosho Co., Ltd., Osaka, Japan

[21] Appl. No.: 364,517

[22] Filed: Jun. 9, 1989

Related U.S. Application Data

[63] Continuation of Ser. No. 147,203, Jan. 22, 1988, abandoned.

[30] Foreign Application Priority Data

Sep. 24, 1987 [JP] Japan ............................ 62-145670[U]
Nov. 6, 1987 [JP] Japan ............................ 62-170576[U]

[51] Int. Cl.[4] .............................................. B65D 85/57
[52] U.S. Cl. .................................... 206/232; 206/309; 206/311; 220/342
[58] Field of Search ................ 190/117; 206/307, 309, 206/310-313, 316, 387, 425, 459, 444, 232; 220/342

[56] References Cited

U.S. PATENT DOCUMENTS

| | | | |
|---|---|---|---|
| 3,612,233 | 10/1971 | Nagpal | 190/117 |
| 3,620,367 | 11/1971 | Stembel | 206/387 |
| 3,743,081 | 7/1973 | Roberg et al. | 206/387 |
| 3,891,070 | 6/1975 | Montanari | 190/117 |
| 3,980,178 | 9/1976 | Schidlowski | 206/313 |
| 4,216,862 | 8/1980 | Daenen | 206/459 |
| 4,336,883 | 6/1982 | Krug et al. | 190/117 |
| 4,369,883 | 1/1983 | Stravitz | 206/387 |
| 4,519,500 | 5/1985 | Perchak | 206/309 |
| 4,627,531 | 12/1986 | Clemens | 206/309 |
| 4,635,792 | 1/1987 | Yamada et al. | 206/312 |
| 4,717,021 | 1/1988 | Ditzig | 206/459 |
| 4,718,550 | 1/1988 | Johnson | 206/459 |

FOREIGN PATENT DOCUMENTS

| | | | |
|---|---|---|---|
| 0409097 | 5/1966 | Australia | 206/459 |
| 0479205 | 12/1951 | Canada | 206/459 |
| 0181994 | 5/1986 | European Pat. Off. | 206/444 |
| 3027804 | 2/1982 | Fed. Rep. of Germany | 206/307 |
| 2143210 | 2/1985 | United Kingdom | 206/307 |

Primary Examiner—Jimmy G. Foster
Attorney, Agent, or Firm—Birch, Stewart, Kolasch & Birch

[57] ABSTRACT

A case for compact disks which comprises two case members. One edge of each of the case members is connected with connecting or hinge members. The two case members are opened and closed at these connecting members. Furthermore, latching means for holding the two case members in the closed state are provided on the other edge of each of the case members. When the two case members are closed, a plurality of storage compartments for storing a multiplicity of compact disks are formed therein.

5 Claims, 13 Drawing Sheets

CASE FOR MULTIPLE COMPACT DISKS

This application is a continuation of application Ser. No. 147,203 filed on January 22, 1988, now abandoned.

BACKGROUND OF THE INVENTION

1. Field of the Invention

The present invention relates to a case for compact disks.

2. Description of the Prior Art

Conventionally, one sheet of compact disk is stored in one case. The conventional disk case requires a large space for storage on a shelf or the like.

SUMMARY OF THE INVENTION

Therefore, the object of the present invention is to provide a case for compact disks which does not require a large space for storage.

A case for compact disks in accordance with the present invention which comprises two case members which form a plurality of storage compartments in cooperation with each other, connecting members which are provided on corresponding edges of the two case members for connecting the two case members in a hinged manner capable of opening the case and closing, latching means formed on the edges edge of each of the two case members opposite the hinged edges for holding the two case members in a closed state, and the enclosed space portion or compartments formed in the case member by the cooperation of the two case members.

In the case for compact disks in accordance with the present invention, a plurality of storage compartments are formed in one case for a multiplicity of compact disks. Accordingly, in accordance with the present invention, a plurality of compact disks can be stored in one case for compact disks, and therefore the space needed for storing them can be reduced.

These objects and other objects, features, aspects and advantages of the present invention will become more apparent from the following detailed description of the embodiments of the present invention when taken in conjunction with accompanying drawings.

DESCRIPTION OF THE PREFERRED EMBODIMENTS

Figure 1:
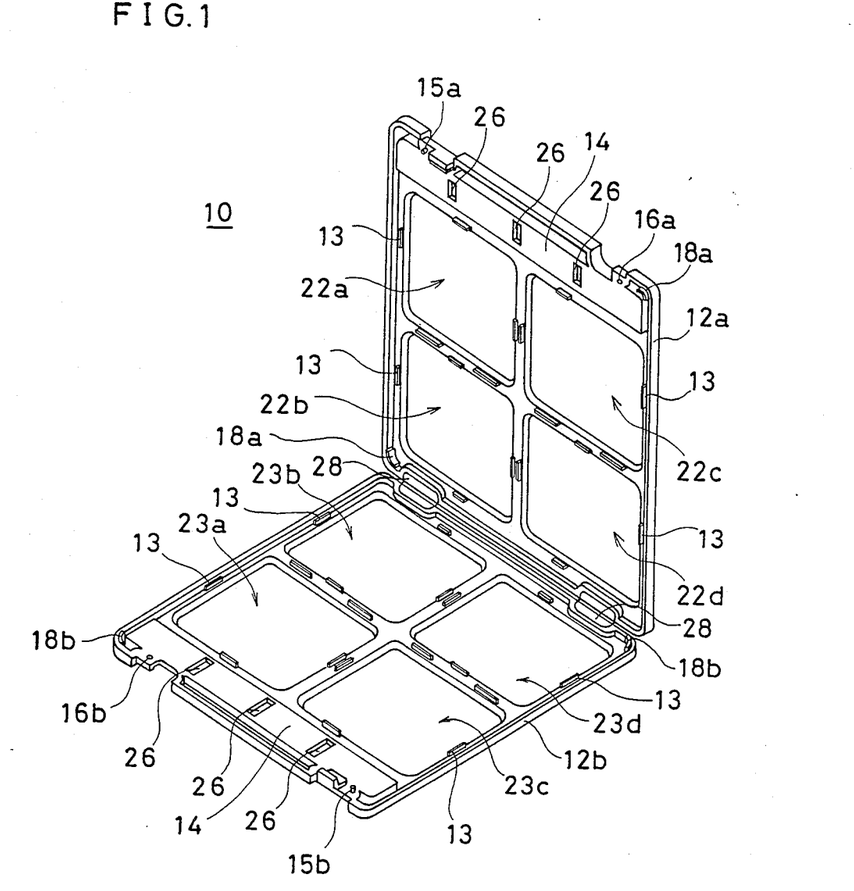
FIG. 1 is a perspective view showing one embodiment in accordance with the present invention.

FIG. 1 is a perspective view showing one embodiment in accordance with the present invention.

A case for compact disks 10 comprises two case members 12a and 12b. These case members 12a and 12b are formed, for example, with transparent synthetic resin so that things stored inside are visible from the outside. Four rectangular concave portions 22a, 22b, 22c and 22d are formed inside the case member 12a. Likewise, four corresponding rectangular concave portions 23a, 23b, 23c and 23d are formed inside the case member 12b. Then, by closing the case members 12a and 12b, four storage compartments 24a, 24b, 24c and 24d are formed in by the cooperation of the complementary concave portions 22a and 23a, the concave portions 22b and 23b, the concave portions 22c and 23c and the concave portions 22d and 23d. Compact disks and the like which, for example, would be stored angularly in a normal case would be stored in these four storage compartments 24a–24d. In addition, rectangular-plate-shaped protrusions 13 are formed at each side of the respective concave portions 22a–22d of the case member 12a and the concave portions 23a–23d of the case member 12b, and the compact disks, which are stored in the storage compartments 24a–24d, are held by these protrusions 13 so as not to shift.

Figure 2:
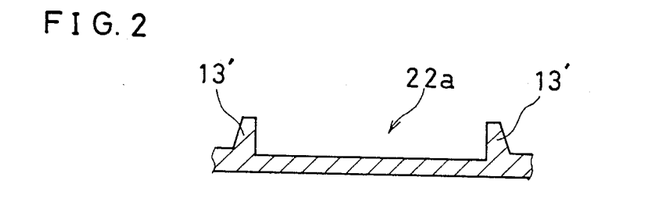
FIG. 2 is a cross-sectional view showing modified protrusions of the case for compact disks, as shown in FIG. 1.

In addition, in the FIG. 1 embodiment, steps are formed between the side walls of the concave portions 22a–22d and the concave portions 23a–23d and the side walls of the protrusions 13, but, as shown in FIG. 2, the concave portions 22a–22d and the concave portions 23a–23d and the protrusions 13' may be formed without forming such steps between them. Thereby, shifting of the stored compact disks can be reduced in comparison with the FIG. 1 embodiment.

Figure 3:
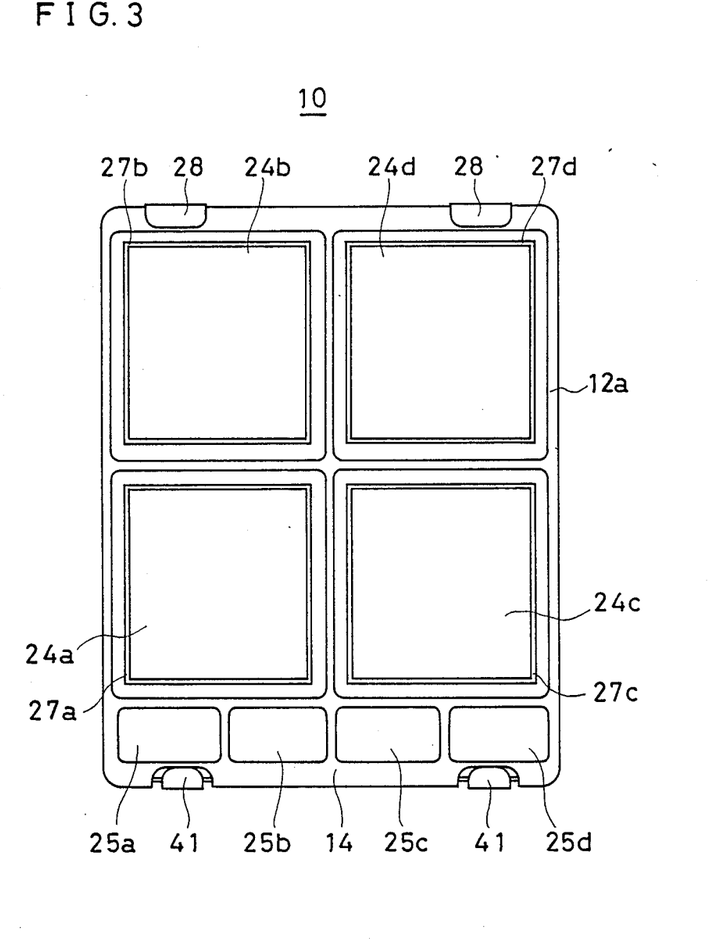
FIG. 3 is a plan view of the case for compact disks, as shown in FIG. 1.

Furthermore, as shown in FIGS. 1 and 3, a space portion 14 is formed in a manner extending from the storage compartments 24a–24d. Card cases 25a, 25b, 25c and 25d are formed in this space portion 14. The card cases 25a–25d are formed along one edge of the case members 12a and 12b. Insert holes 26 communicating with the card cases 25a–25d are formed on the inner side of the case members 12a and 12b. Then, for example, a card is put in through this insert hole 26. For example, the title of the content recorded in the compact disk is written on this card. Then, the title or the like entered in the card can be read from the surface of the case 10. For example, flexible and transparent synthetic resin plates are fitted into these card cases 25a–25d, and thereby the cards can be prevented from staining. These card cases 25a–25d are formed also in the case member 12b. On the outside surface of the case member 12a, protrusion lines 27a, 27b, 27c and 27d are formed along the outer peripheries of the storage compartments 24a–24d. These protrusion lines can also be formed on the outside surface of case member 12b. The presence of these protrusion lines 27a–27d can prevent the surfaces of the cases 10 from being injured when a plurality of cases 10 are stacked.

Figure 4:
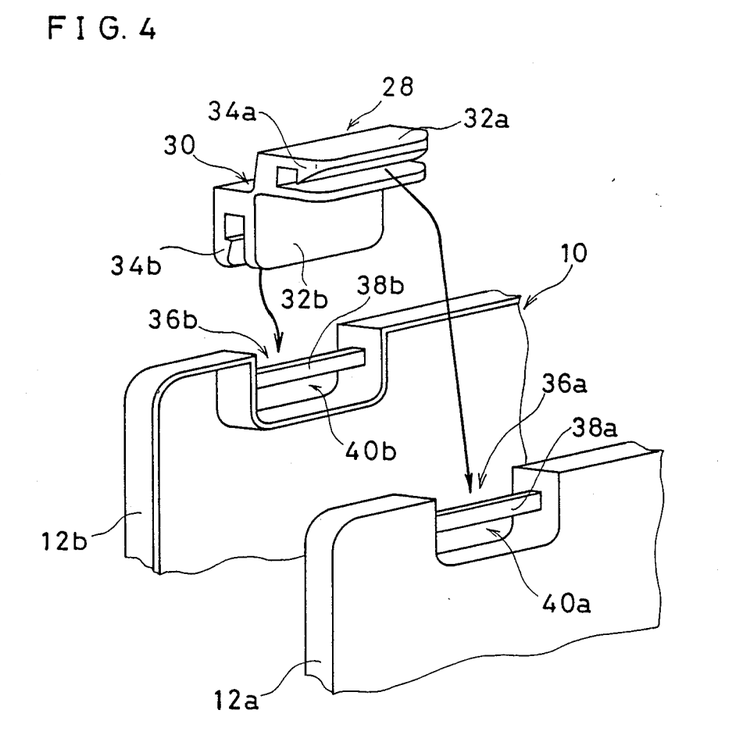
FIG. 4 is a segmented perspective view showing a connecting member used for the case as shown in FIG. 1.

As shown in FIG. 4, connecting members 28 are formed along one edge of each of the case members 12a and 12b. This connecting member 28 is formed, for example, with synthetic resin. A center part 30 of the connecting member 28 is formed thin. Thus, the connecting member 28 can be bent as a hinge at the center part 30. Engaging parts 32a and 32b having a U-shaped cross-section are formed on both sides of the center part 30 of the connecting member 28. Inside the engaging parts 32a and 32b of this connecting member 28 are formed engaging convex parts 34a and 34b which protrude gradually in the direction of the inner part.

Engaging spaces 36a and 36b are formed in the edges of the case members 12a and 12b. The engaging spaces 36a and 36b of the case members 12a and 12b are shaped so as to receive the engaging spaces 32a and 32b of the connecting member 28. Then, within the engaging parts 36a and 36b, engaging members 38a and 38b are formed, which extend in the longitudinal direction thereof, forming engaging concave areas 40a and 40b which engage the engaging convex parts 34a and 34b of the connecting member 28.

Figure 5:
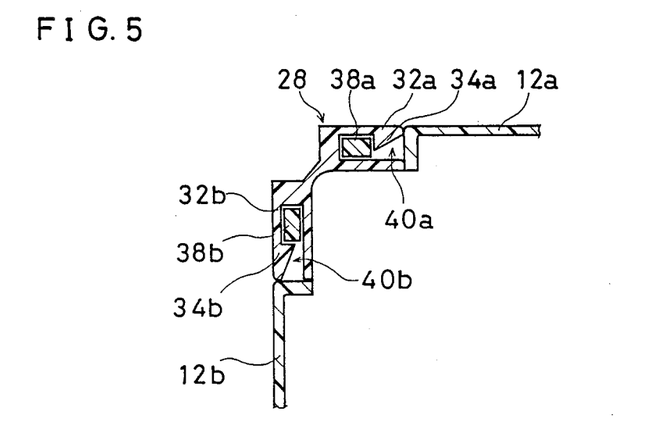
FIG. 5 is a cross-sectional view showing the state wherein the connecting member, as shown in FIG. 4 is attached to the case for compact disks.

The engaging parts 32a and 32b of the connecting member 28 are engaged in the engaging spaces 36a and 36b of the case members 12a and 12b. At this time, as shown in FIG. 5, the engaging convex parts 34a and 34b of the connecting member 28 are engaged in the engaging concave areas 40a and 40b of the case members 12a and 12b, and thereby the connecting member 28 is fixed to the case members 12a and 12b.

Thus, the connecting member 28 can be simply attached to the case members 12a and 12b by engaging it in the engaging spaces 36a and 36b thereof.

Figure 6:
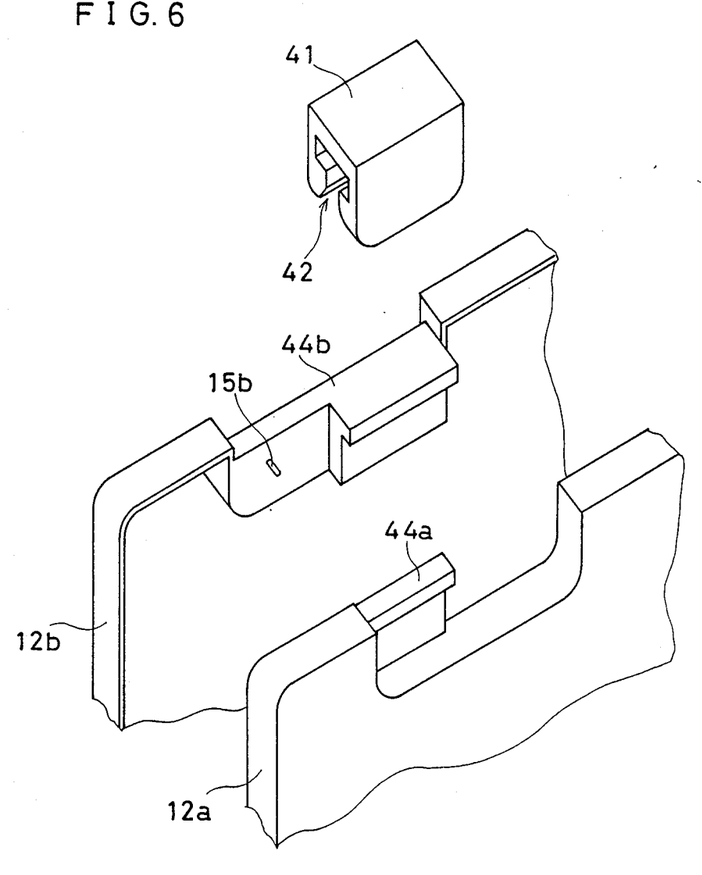
FIG. 6 is a segmented perspective view showing a stopper used for the case for compact disks, as shown in FIG. 1.

Latching means 41 are formed on the edge of the case 10. As shown in FIG. 6, latching means 41 is formed so as to have a C-shaped cross-section. This means that the stopper 41 comprises a groove 42 which is formed so as to have a wider interior.

Figure 7:
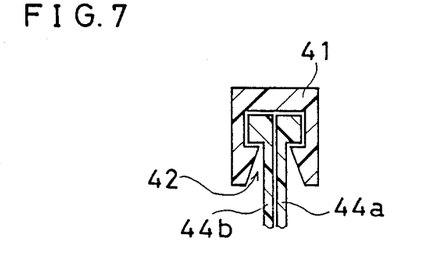
FIG. 7 is a cross-sectional view showing the state wherein two case members are closed by the stopper as shown in FIG. 6.

Mounting parts 44a and 44b for mounting the stopper 41 are formed in the case members 12a and 12b. These mounting parts 44a and 44b are formed so that the top end portions thereof protrude in the width direction. The top end portions of these mounting parts 44a and 44b are engaged with the groove 42 of the latching means 41. Thus, a half of the mounting part 44b, for example, in the longitudinal direction is engaged with the groove 42 of the latching means 41, while the remaining half thereof abuts the mounting part 44a, thereby also being engaged with the groove 42 of the stopper 41. Accordingly, as shown in FIG. 7, the mounting parts 44a and 44b abut each other and are engaged with the groove 42 of the latching means 41, and thereby the case 10 is held in the closed state.

In addition, as shown in FIG. 1, a fixing protrusion 15a and a fixing hole 16a are formed respectively at the corners of the case member 12a, and a fixing hole 16b and a fixing protrusion 15b are formed respectively at the corresponding corners of the case member 12b so as to correspond to the fixing protrusion 15a and the fixing hole 16a respectively, and when the case members 12a and 12b are closed, these fixing protrusions 15a and 15b and fixing holes 16b and 16a engage with each other respectively to prevent the case members 12a and 12b from shifting. Also, a fixing protrusion part 18a having an arc-shaped cross-section is formed at the corner of the periphery of the card case 25d and the case member 12a, and a fixing protrusion part 18b having an arc-shaped cross-section is formed at the corner of the periphery of the card case 25d of the case member 12b, and these fixing protrusion parts 18a and 18b also enable the case members 12a and 12b to be closed without shifting.

This case for compact disks 10 is formed, for example, in the same size as that of a jacket for a LP (long-playing) record. Therefore, the case 10 for compact disks, having the same size as that of the jacket of a LP record, can store four compact disks that are put in a normal case. This case 10 for compact disks can be stored on a record storing shelf together with other LP records, and any special shelf for compact disks can be dispensed with. Furthermore, since one case can store four compact disks, the space for storage can be reduced.

While, in the above-described embodiment, one compact disk is stored in each of the storage compartments 24a–24d, two compact disks may also be stored in each of the storage compartments 24a–24d. In this case, for example, the concave portions 23a–23d of the case member 12b are formed so as to have a larger depth. Then, two compact disks are put in each of the concave portions 23a–23d and the case 10 is closed, and thereby eight compact disks can be stored in the case 10.

Figure 8:
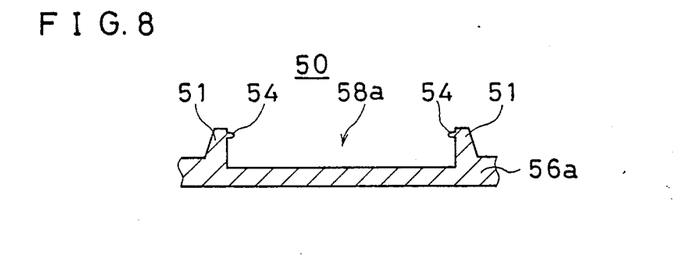
FIG. 8 is a cross-sectional view showing a principal part of the case for compact disks shown in FIG. 1.

Furthermore, one compact disk can be stored in each of the concave portions 22a–22d and the concave portions 23a–23d. In this case, as shown in FIG. 8, another holding protrusion 54 is formed on the side wall of the protrusion 51. These holding protrusions 54 prevent the stored compact disks from dropping out of the concave portion 58a when the case member 56a are inclined. Thus, eight compact disks may be stored in a case 50.

Figure 9:
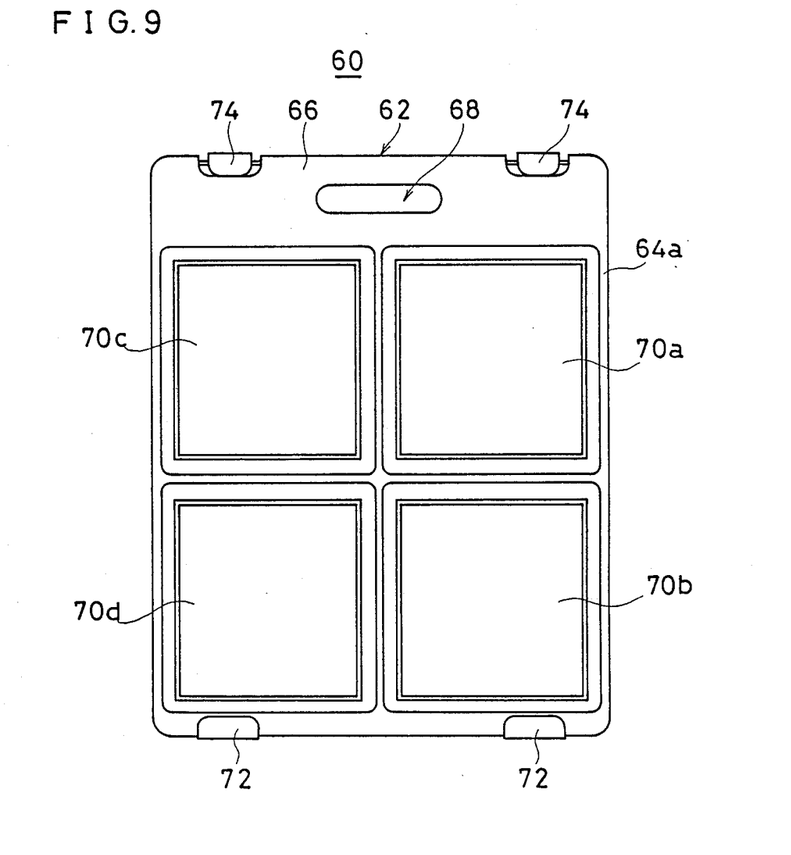
FIG. 9 is a plan view showing a modified example of the 10 case for compact disks shown in FIG. 1.

Also, as shown in FIG. 9, a handle 62 may be provided in place of the card cases 25a–25d in the space portion 14. To form the handle 62, oblong carry holes 68 are formed in the space portions of the case members 64a. The case 60 is easily carried by inserting the hand into these holes 68. The case 60 comprises storage compartments 70a–70d, connecting members 72 and latching means 71.

Figure 10:
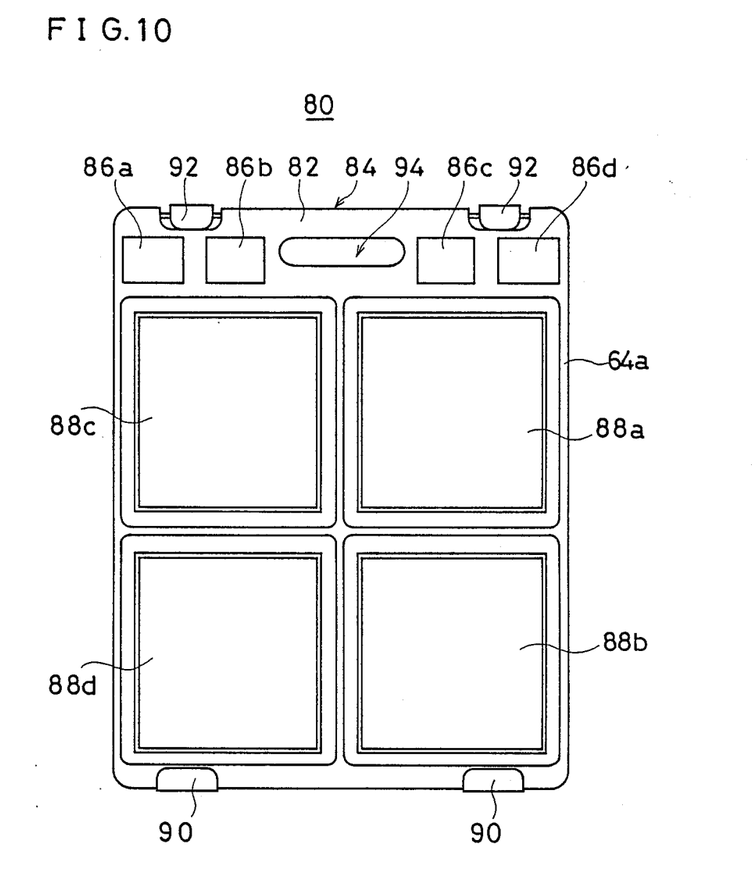
FIG. 10 is a plan view showing another manifold example of the case for compact disks shown in FIG. 1.

Furthermore, the handle 84 and the card cases 86a–86d may be formed simultaneously in the space portion 82. In this case, as shown in FIG. 10, for example, the card cases 86a–86d are formed on the both sides of the handle 84. The case 80 comprises storage parts 88a–88d, connecting members 90, latching means 92 and carry hole 94.

Figure 11:
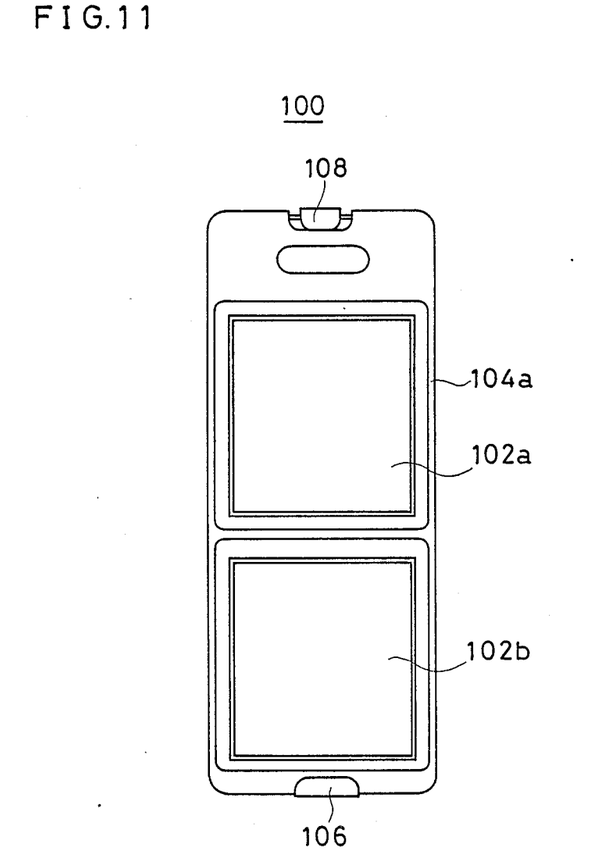
FIG. 11 is a plan view showing still another modified example of the case for compact disks shown in FIG. 1.

In addition, in the above-described embodiment, four storage compartments 88—88 are formed, but as shown in FIG. 11, two storage compartments 102a and 102b may be formed. It is needless to say that two compact disks may be stored in each of the storage compartments 102a and 102b. The case 100 comprises a pair of case members 104a, one connecting member 106 and one latching means 108.

Figure 12:
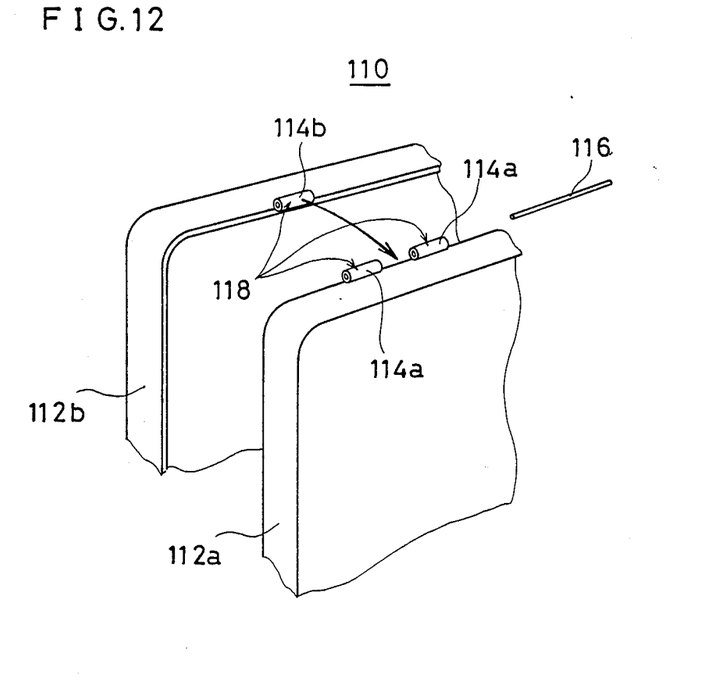
FIG. 12 is a perspective view showing another embodiment of the connecting member shown in FIG. 4.

Also, as shown in FIG. 12, for the connecting member 118, cylindrical convex parts 114a and 114b may be formed in the case members 112a and 112b. Then, the two case members 112a and 112b are connected to each other by inserting a shaft 116 into these convex parts 114a and 114b. Accordingly, the case 110 is opened or closed with the shaft 116 as a center.

Figure 13:
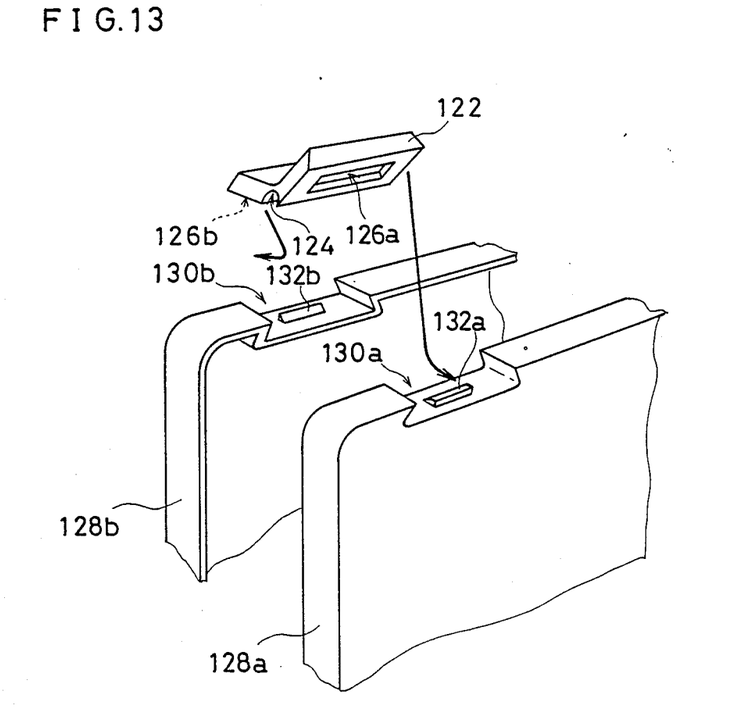
FIG. 13 is a perspective view showing still another embodiment of the connecting member shown in FIG. 4.

Also, as shown in FIG. 13, the connecting member may be formed so as to have a trapezoidal cross-section. At the center of the bottom surface of this connecting member 122, a bent groove 124 is formed spreading from one slanting surface side to the other slanting surface side. Accordingly, the center part of the connecting member 112 is formed thin, and thereby the connecting member 122 is formed so as to be able to be bent at the center part thereof. On the bottom surface of the connecting member 122, two rectangular engaging concave portions 126a and 126b are formed with the bent groove 124 sandwiched inbetween.

The engaging areas 130a and 130b of the case members 128a and 128b are formed so that the width thereof becomes larger gradually progressing toward the inside from the surface. Thus, the engaging areas 130a and 130b are formed so as to be able to engage with the connecting member 122 having a trapezoidal cross-section. The engaging convex projections 132a and 132b are formed in the centers of the engaging areas 130a and 130b. The engaging convex projections 132a and 132b are formed so as to protrude gradually as they advance toward the other end from one end thereof. This means that the engaging convex projections 132a and 132b are formed so as to have a triangular cross-section.

The engaging areas 130a and 130b are engaged with the connecting member 122. At this time, the engaging convex projections 132a and 132b of the case members 128a and 128b are engaged respectively with the engaging concave portions 126a and 126b of the connecting member 122. This means that the connecting member 122 is engaged with the engaging areas 130a and 130b, and the engaging concave portions 126a and 126b are engaged with the engaging convex projections 132a and 132b, and thereby the connecting member 122 is fixed to the case member 128a and 128b.

Figure 14:
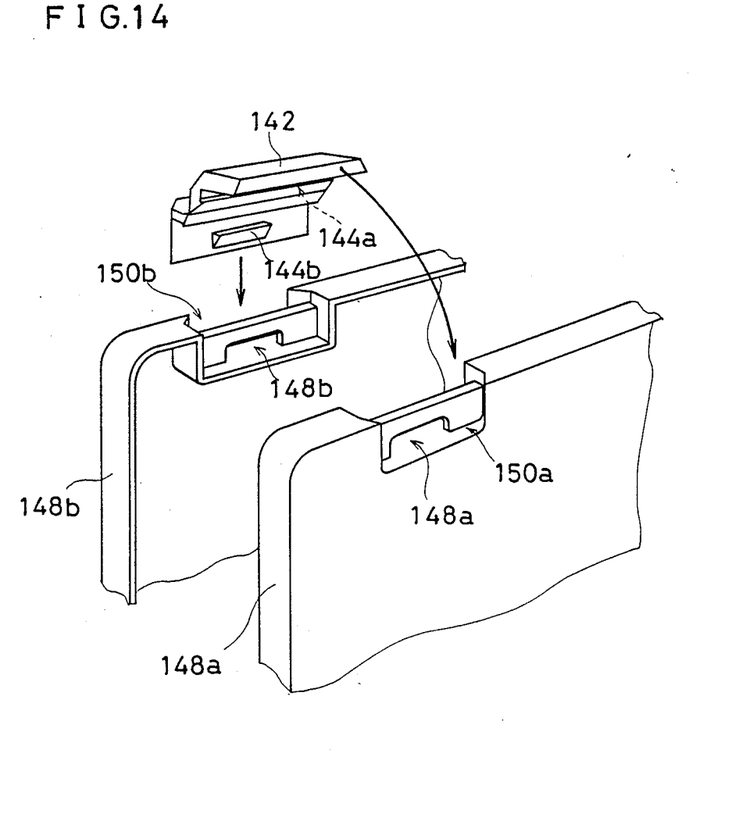
FIG. 14 is a perspective view showing an alternate embodiment of the connecting member shown in FIG. 4.

Furthermore, as shown in FIG. 14, it is also possible that engaging convex portions 144a and 14b are formed in the connecting member 142 and engaging concave areas 148a and 148b are formed in each of the case members 146a and 146b. In this case, the connecting member 142 is formed also so as to have a trapezoidal cross-section, and in the case members 146a and 146b, the engaging spaces 150a and 150b are formed in a shape capable of engaging with the connecting member 142. Then, the connecting member 142 is engaged with the engaging spaces 150a and 150b, and the engaging convex projections 144a and 144b are engaged with engaging concave areas 148a and 148b. Thus, the connecting member 142 is fixed to the case members 146a and 146b.

Figure 15:
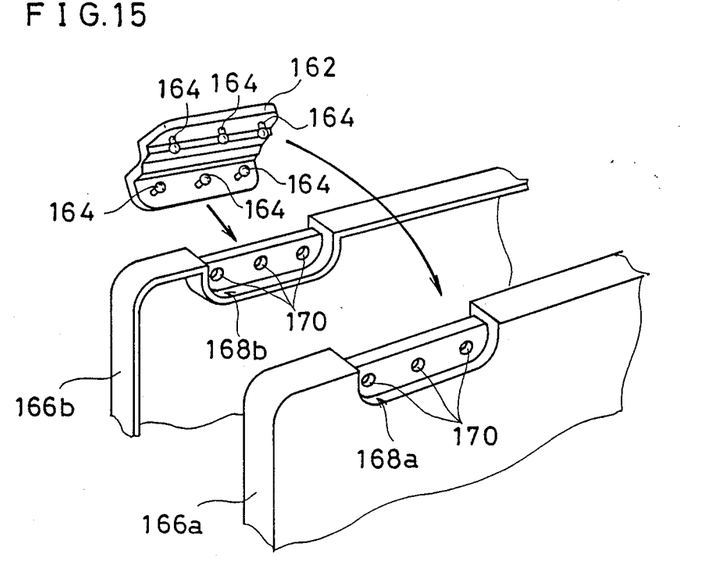
FIG. 15 is a perspective view of a still different embodiment of the connecting member as shown in FIG. 4.

Furthermore, as shown in FIG. 15, a plurality of protrusion-shaped convex elements 164 may be formed in the connecting member 162. The tip of this engaging convex element 164 is formed so as to have an outer diameter larger than that of the bottom portion thereof. Then, in the engaging spaces 168a and 168b of the case members 166a and 166b, engaging holes 170 as engaging concave areas fitting to the width of the bottom portion of the engaging convex projections 164 are formed. Then, the engaging convex projections 164 are engaged with these engaging holes 170 and thereby the connecting member 162 is fixed to the case members 166a and 166b. In this case, the outer diameter of the tip of the engaging convex projection 164 is formed larger, and therefore the connecting member 162 will never come off the case members 166a and 166b.

Figure 16:
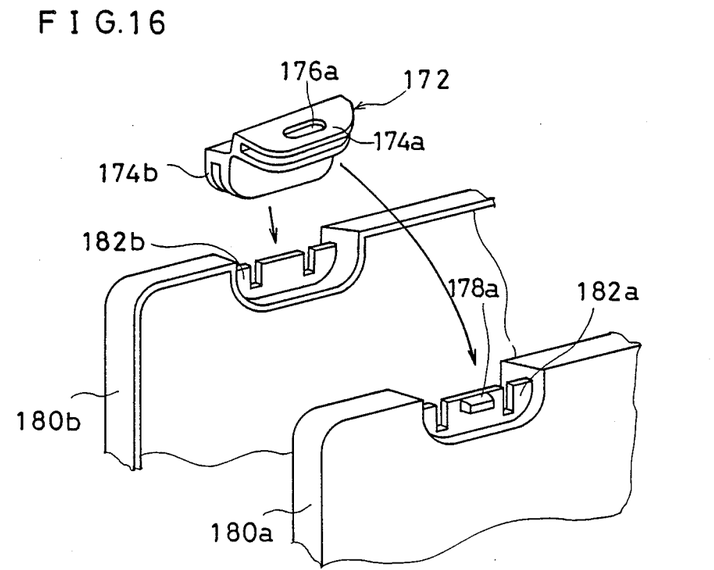
FIG. 16 is a perspective view showing a modified example of the connecting member shown in FIG. 4.

FIG. 16 is a perspective view showing a modified example of the connecting member, as shown in FIG. 4. In comparison with the connecting member as shown in FIG. 4, in this connecting member 172 the convex parts 34a and 34b are not formed in the engaging parts 32a and 32b, but oblong engaging holes 176a(b) are formed in the engaging parts 174a and 174b. Then, engaging convex protrusions 178a(b) are formed in the engaging members 182a and 182b of the case members 180a and 180b so as to engage with these engaging holes 176a(b). In addition, it is not required to engage the engaging convex protrusions 34a and 34b, as shown in FIG. 4, with these engaging members 182a and 182b, and therefore engaging concave parts 40a and 40b are not necessary.

Figure 17:
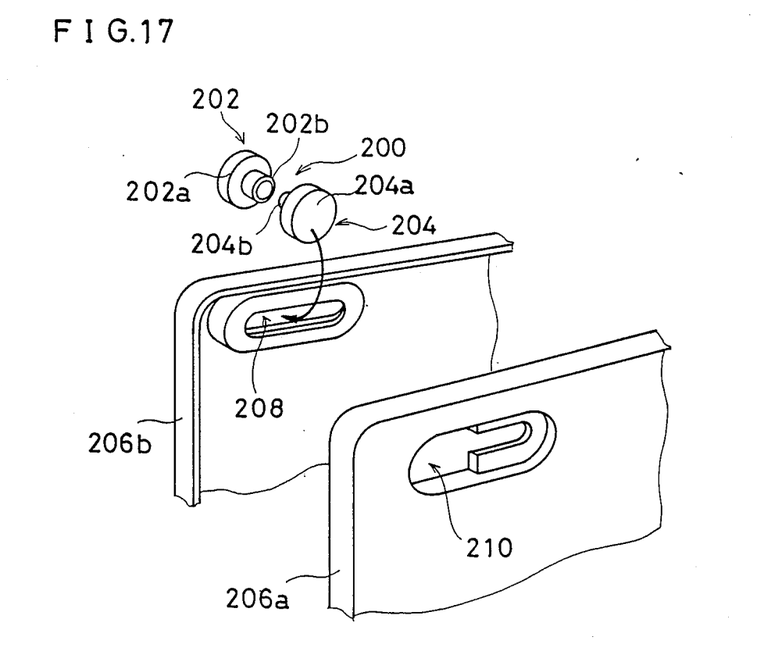
FIG. 17 is a perspective view showing an alternate embodiment of the stopper shown in FIG. 6.

Also, in place of the above-mentioned latching means 41, as shown in FIG. 17, the latching means 200 may be constituted with a first latching member 202 and a second latching member 204. The first latching member 202 comprises a column 202a and a cylinder 202b extending from the column 202a. The outer diameter of the cylinder 202b is formed smaller than the outer diameter of the column 202a. The second latching member 204 is constituted of a column 204a and a fixing convex part 204b extending from the column 204a. This fixing convex part 204b is formed in a columnar shape and the outer diameter thereof is formed so as to be equal to the inner diameter of the cylinder 202b of the first latching member 202.

In the case member 206b, a fixing oblong hole 208 is formed whose width is slightly larger than the outer diameter of the cylinder 202b of the first latching member 202. Then, the cylinder 202b of the first latching member 202 is inserted into this hole 208. The fixing convex part 204b of the second latching member 204 is fitted into this cylinder 202b. Accordingly, the latching means 200 is formed through the fixing hole 208.

In the case member 206a, a fixing oblong hole 210 is formed at the position corresponding to the fixing hole 208.

Figure 18:
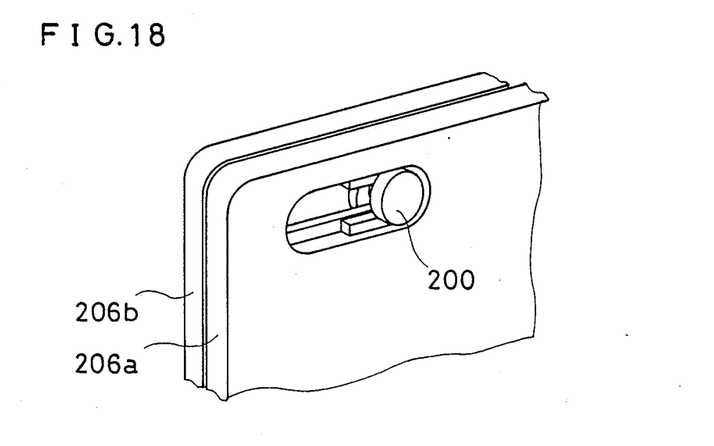
FIG. 18 is a perspective view showing the state whereby the case is closed by the stopper as shown in FIG. 17.

A half of this fixing hole 210 in the longitudinal direction is formed in the same width as the fixing hole 208, and the remaining half is formed in a width larger than the outer diameter of the column 204a. Accordingly, the column 204a is inserted through the portion larger in width of the fixing hole 210. Then, the latching means 200 is moved in the longitudinal direction of the fixing holes 208 and 210, and thereby the latching means 200 is moved to the portion smaller in width of the fixing hole 210. Thereby, as shown in FIG. 18, the case can be held in the closed state by the stopper 210.

Figure 19:
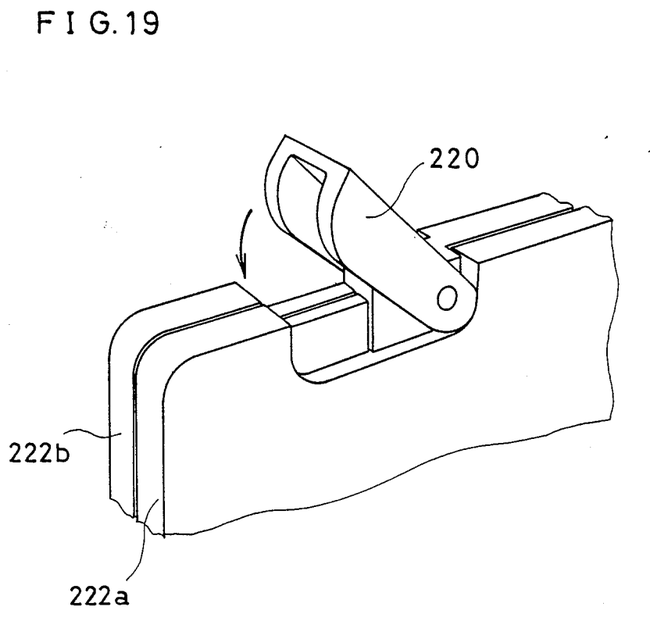
FIG. 19 is a perspective view showing still another embodiment of the stopper shown in FIG. 6.

Furthermore, as shown in FIG. 19, the latching means 220 may be formed so as to sandwich the case members 222a and 222b. In this case, the latching means 220 is attached to the case member 222b in a manner capable of swinging. Then, the case members 222a and 222b are superposed on each other, and are sandwiched by the latching means 220, and thereby the case is closed.

In addition, in the above-described embodiment, the connecting member 28 is attached to the case members 12a and 12b by engaging, but the connecting member 28 may be formed in one-piece with the case members 12a and 12b. In this case, the connecting member 28 is formed this so as to be able to be bent.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A compact disk carrying case comprising:

two separate and distinct case members for forming a plurality of storage compartments in cooperation with each other in a closed state, each of said case members including a plurality of concave portions for the purpose of storing said compact disks, each concave portion in one case member being complimentary to a corresponding concave portion in the other of said case members each of said case members being provided along corresponding edges with engaging means, detachable connecting members provided on said corresponding edges of said two case members for connecting with said engaging means for hinging said two case members in a manner capable of opening and closing said case, and latching means provided at corresponding edges of each case member opposite said hinged edges of said two case members for holding said two case members in a closed state, thereby forming said plurality of storage compartments for containing a multiplicity of compact disks.

2. A case for compact disks in accordance with claim 1, wherein vertical protrusions are formed on the inner surface of each of said case members at the sides of each of said concave portions each vertical protrusion having a horizontal ledge extension such that said compact disks are reliably retained in said compartments.

3. A case for compact disks in accordance with claim 1, wherein card carrying compartments for indicia are provided in a portion of said respective case members juxtapositioned to said edges of said case members adjacent said latching means.

4. A case for compact disks in accordance with claim 3, further including a handle means formed in said compartment containing portion of said case member.

5. A case for compact disks in accordance with claim 1, wherein protrusions are formed along the outer peripheries of said storage compartments on the outside surfaces of each of said case members so as to prevent damage to said outside surfaces of said case.

* * * * *